(12) United States Patent
Masserant et al.

(10) Patent No.: US 6,199,878 B1
(45) Date of Patent: Mar. 13, 2001

(54) SHOPPING CART SAFETY BRAKE SYSTEM

(76) Inventors: Mark M. Masserant; Deborah L. Masserant, both of 8396 Strong Rd., Newport, MI (US) 48166

( * ) Notice: Subject to any disclaimer, the term of this patent is extended or adjusted under 35 U.S.C. 154(b) by 0 days.

(21) Appl. No.: 09/238,907

(22) Filed: Jan. 28, 1999

(51) Int. Cl.[7] .................................................. B62D 39/00
(52) U.S. Cl. ......................................... 280/33.994; 188/19
(58) Field of Search ........................ 280/33.994, 33.992; 188/19

(56) References Cited

U.S. PATENT DOCUMENTS

| | | | | |
|---|---|---|---|---|
| 3,095,211 | * | 6/1963 | Altherr | 280/33.99 |
| 3,501,164 | * | 3/1970 | Peterson | 280/33.99 |
| 4,018,449 | * | 4/1977 | Anderson | 280/33.99 |
| 4,706,975 | * | 11/1987 | Arena et al. | 280/33.99 |
| 4,840,388 | * | 6/1989 | Doughty | 280/33.994 |
| 4,976,447 | * | 12/1990 | Batson | 280/33.994 |
| 5,090,517 | * | 2/1992 | Doughty | 188/19 |
| 5,288,089 | * | 2/1994 | Bowers et al. | 280/33.994 |
| 5,325,938 | * | 7/1994 | King | 188/19 |
| 5,390,942 | * | 2/1995 | Schuster et al. | 280/33.994 |
| 5,499,697 | * | 3/1996 | Trimble et al. | 188/19 |
| 5,735,367 | * | 4/1998 | Brubaker | 188/19 |

* cited by examiner

Primary Examiner—J. J. Swann
Assistant Examiner—J. Allen Shriver

(57) ABSTRACT

A shopping cart safety brake system for preventing a shopping cart from rolling away from a user. The shopping cart safety brake system includes a shopping cart and a generally rectangular inverted U-shaped connector member having a spaced apart pair of elongate side rods and an upper rod connecting the side rods together. The upper rod is positioned adjacent a handle bar of the shopping cart so that the side rods downwardly depend from the upper rod. Each of the lower ends of the side rods has a pivot arm pivotally coupled to the shopping cart at a pivot point. Each of the pivot arms has a brake pad which abuts an associated adjacent rear wheel of the shopping cart when the brake pads are pivoted towards an engaged position such that each brake pad holds the associated rear wheel against rotation.

20 Claims, 2 Drawing Sheets

SHOPPING CART SAFETY BRAKE SYSTEM

BACKGROUND OF THE INVENTION

1. Field of the Invention

The present invention relates to brake systems for a shopping cart and more particularly pertains to a new shopping cart safety brake system for preventing a shopping cart from rolling away from a user.

2. Description of the Prior Art

The use of brake systems for a shopping cart is known in the prior art. More specifically, brake systems for a shopping cart heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,706,975; U.S. Pat. No. 5,090,517; U.S. Pat. No. 4,084,663; U.S. Pat. No. 3,276,550; U.S. Pat. No. Des. 339,096; and U.S. Pat. No. 3,366,201.

While these devices fulfill their respective, particular objectives and requirements, the aforementioned patents do not disclose a new shopping cart safety brake system. The inventive device includes a shopping cart and a generally rectangular inverted U-shaped connector member having a spaced apart pair of elongate side rods and an upper rod connecting the side rods together. The upper rod is positioned adjacent a handle bar of the shopping cart so that the side rods downwardly depend from the upper rod. Each of the lower ends of the side rods has a pivot arm pivotally coupled to the shopping cart at a pivot point. Each of the pivot arms has a brake pad which abuts an associated adjacent rear wheel of the shopping cart when the brake pads are pivoted towards an engaged position such that each brake pad holds the associated rear wheel against rotation.

In these respects, the shopping cart safety brake system according to the present invention substantially departs from the conventional concepts and designs of the prior art, and in so doing provides an apparatus primarily developed for the purpose of prevent a shopping cart from rolling away from a user.

SUMMARY OF THE INVENTION

In view of the foregoing disadvantages inherent in the known types of brake systems for a shopping cart now present in the prior art, the present invention provides a new shopping cart safety brake system construction wherein the same can be utilized for preventing a shopping cart from rolling away from a user.

The general purpose of the present invention, which will be described subsequently in greater detail, is to provide a new shopping cart safety brake system apparatus and method which has many of the advantages of the brake systems for a shopping cart mentioned heretofore and many novel features that result in a new shopping cart safety brake system which is not anticipated, rendered obvious, suggested, or even implied by any of the prior art brake systems for a shopping cart, either alone or in any combination thereof.

To attain this, the present invention generally comprises a shopping cart and a generally rectangular inverted U-shaped connector member having a spaced apart pair of elongate side rods and an upper rod connecting the side rods together. The upper rod is positioned adjacent a handle bar of the shopping cart so that the side rods downwardly depend from the upper rod. Each of the lower ends of the side rods has a pivot arm pivotally coupled to the shopping cart at a pivot point. Each of the pivot arms has a brake pad which abuts an associated adjacent rear wheel of the shopping cart when the brake pads are pivoted towards an engaged position such that each brake pad holds the associated rear wheel against rotation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new shopping cart safety brake system apparatus and method which has many of the advantages of the brake systems for a shopping cart mentioned heretofore and many novel features that result in a new shopping cart safety brake system which is not anticipated, rendered obvious, suggested, or even implied by any of the prior art brake systems for a shopping cart, either alone or in any combination thereof.

It is another object of the present invention to provide a new shopping cart safety brake system which may be easily and efficiently manufactured and marketed.

It is a further object of the present invention to provide a new shopping cart safety brake system which is of a durable and reliable construction.

An even further object of the present invention is to provide a new shopping cart safety brake system which is susceptible of a low cost of manufacture with regard to both materials and labor, and which accordingly is then susceptible of low prices of sale to the consuming public, thereby making such shopping cart safety brake system economically available to the buying public.

Still yet another object of the present invention is to provide a new shopping cart safety brake system which provides in the apparatuses and methods of the prior art some of the advantages thereof, while simultaneously overcoming some of the disadvantages normally associated therewith.

Still another object of the present invention is to provide a new shopping cart safety brake system for preventing a shopping cart from rolling away from a user.

Yet another object of the present invention is to provide a new shopping cart safety brake system which includes a shopping cart and a generally rectangular inverted U-shaped connector member having a spaced apart pair of elongate side rods and an upper rod connecting the side rods together. The upper rod is positioned adjacent a handle bar of the shopping cart so that the side rods downwardly depend from the upper rod. Each of the lower ends of the side rods has a pivot arm pivotally coupled to the shopping cart at a pivot point. Each of the pivot arms has a brake pad which abuts an associated adjacent rear wheel of the shopping cart when the brake pads are pivoted towards an engaged position such that each brake pad holds the associated rear wheel against rotation.

Still yet another object of the present invention is to provide a new shopping cart safety brake system which requires a user to grasp the push handle of the shopping cart to disengage the brakes holding the wheels of the shopping cart against rotation. This way if the user lets go of the shopping cart, the shopping cart stays in place and does not roll away from the user.

Even still another object of the present invention is to provide a new shopping cart safety brake system that prevents shopping carts abandoned in a parking lot from rolling into vehicles in the parking lot due to blowing wind or hills that cause traditional shopping carts to roll.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
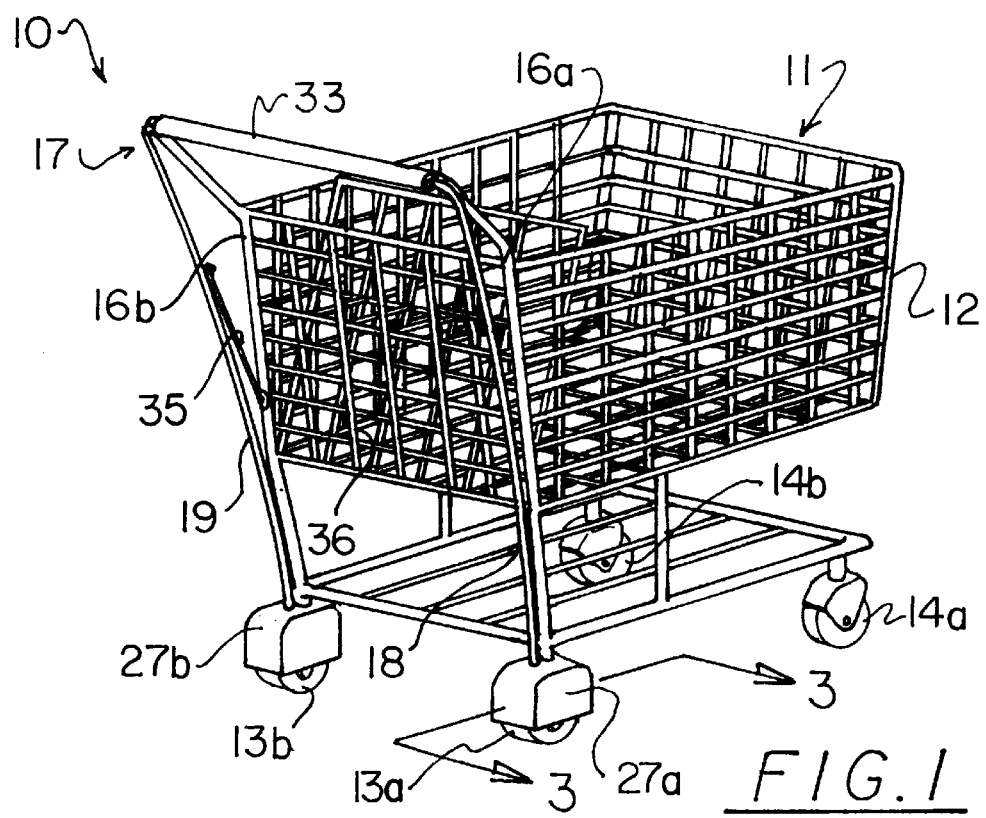
FIG. 1 is a schematic perspective view of a new shopping cart safety brake system according to the present invention.
Figure 2:
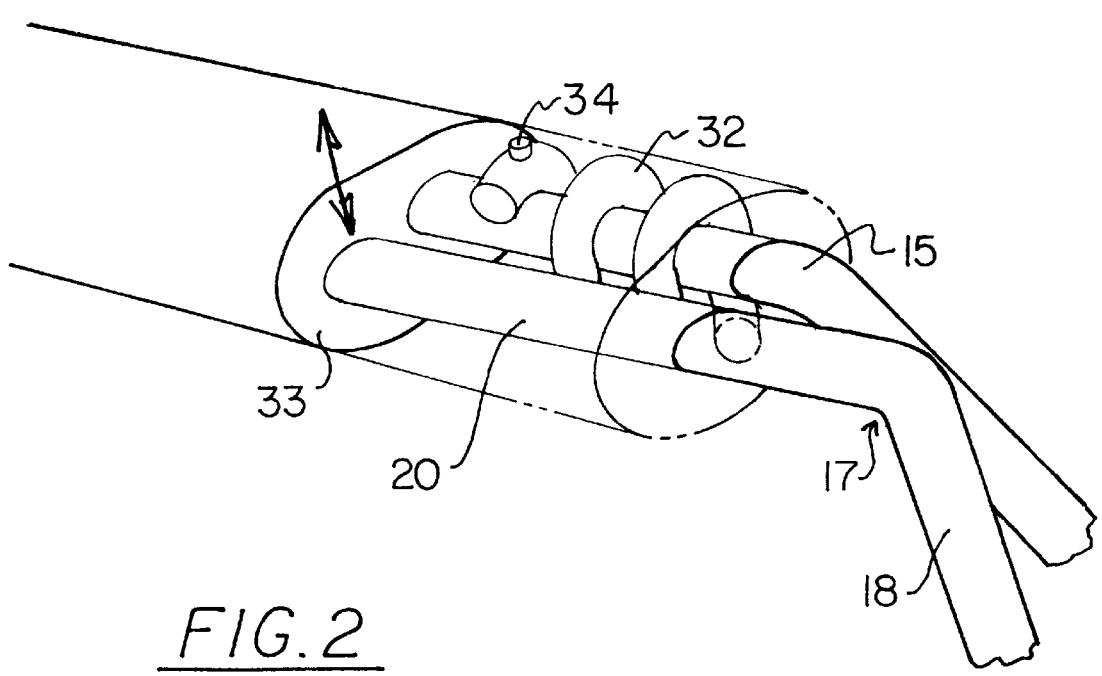
FIG. 2 is a schematic enlarged brakeaway perspective view of the handle bar region of the present invention.

With reference now to the drawings, and in particular to FIGS. 1 through 4 thereof, a new shopping cart safety brake system embodying the principles and concepts of the present invention and generally designated by the reference numeral 10 will be described.

As best illustrated in FIGS. 1 through 4, the shopping cart safety brake system 10 generally comprises a shopping cart and a generally rectangular inverted U-shaped connector member having a spaced apart pair of elongate side rods and an upper rod connecting the side rods together. The upper rod is positioned adjacent a handle bar of the shopping cart so that the side rods downwardly depend from the upper rod. Each of the lower ends of the side rods has a pivot arm pivotally coupled to the shopping cart at a pivot point. Each of the pivot arms has a brake pad which abuts an associated adjacent rear wheel of the shopping cart when the brake pads are pivoted towards an engaged position such that each brake pad holds the associated rear wheel against rotation.

In closer detail, the shopping cart safety brake system 10 comprises a shopping cart 11 having a basket 12, a pair of ground engaging rear wheels 13a,13b and a pair of ground engaging front wheels 14a,14b, and a rearwardly located handle bar 15 positioned above the rear wheels of the shopping cart behind the basket of the shopping cart. The handle bar has a pair of opposite ends and a longitudinal axis extending between the ends of the handle bar in a generally horizontal plane. The ends of the handle bar are coupled to a pair of rear supports 16a,16b of the shopping cart.

A generally rectangular inverted U-shaped connector member 17 has a spaced apart pair of elongate side rods 18,19 and an upper rod 20 connecting upper ends of the side rods together. Each of the rods of the connector member has a longitudinal axis. The longitudinal axes of the side rods are extended generally parallel to one another and generally perpendicular to the longitudinal axis the upper rod. The upper rod is positioned adjacent the handle bar. The longitudinal axes of the handle bar and the upper rod are extended generally parallel to one another so that the side rods downwardly depending from the upper rod.

Figure 3:
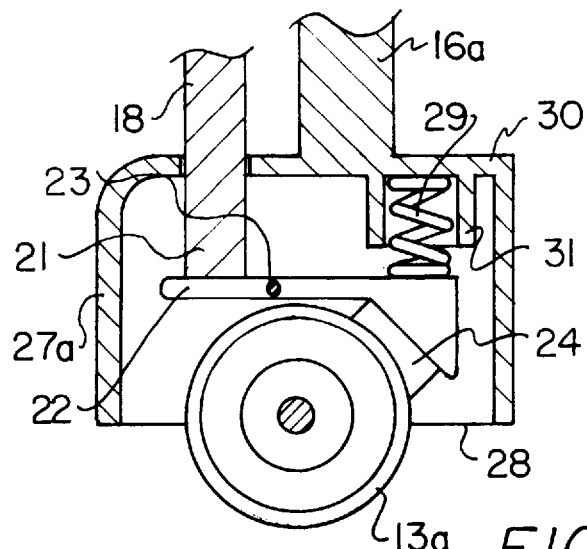
FIG. 3 is a schematic cross sectional side view of a wheel housing region of the present invention.

With reference to FIG. 3, each of the side rods terminates at a lower end 21. The lower end of a first of the side rods is positioned adjacent a first of the rear wheels and the lower end of a second of the side rods is positioned adjacent a second of the rear wheels. Each of the lower ends of the side rods has a pivot arm 22 coupled thereto. Each of the pivot arms is pivotally coupled to the shopping cart at a pivot point 23. Each of the pivot arms has a brake pad 24 positioned on the pivot arm so that the pivot point of each pivot arm is interposed between the lower end of the respective side rod and the associated brake pad of the respective pivot arm.

Each of the pivot arms is pivotable to position the associated brake pad between an engaged position and a disengaged position. As illustrated in FIG. 3, the brake pad of each of the pivot arms abuts the associated adjacent rear wheel when the respective brake pad is in the engaged position such that each brake pad holds the associated rear wheel against rotation. The brake pads preferably comprises a resiliently compressible material such as a rubber material for frictionally enhancing the contact between the brake pad and the associated rear wheel to help hold the associated rear wheel against rotation when the brake pad is in the engaged position.

Figure 4:
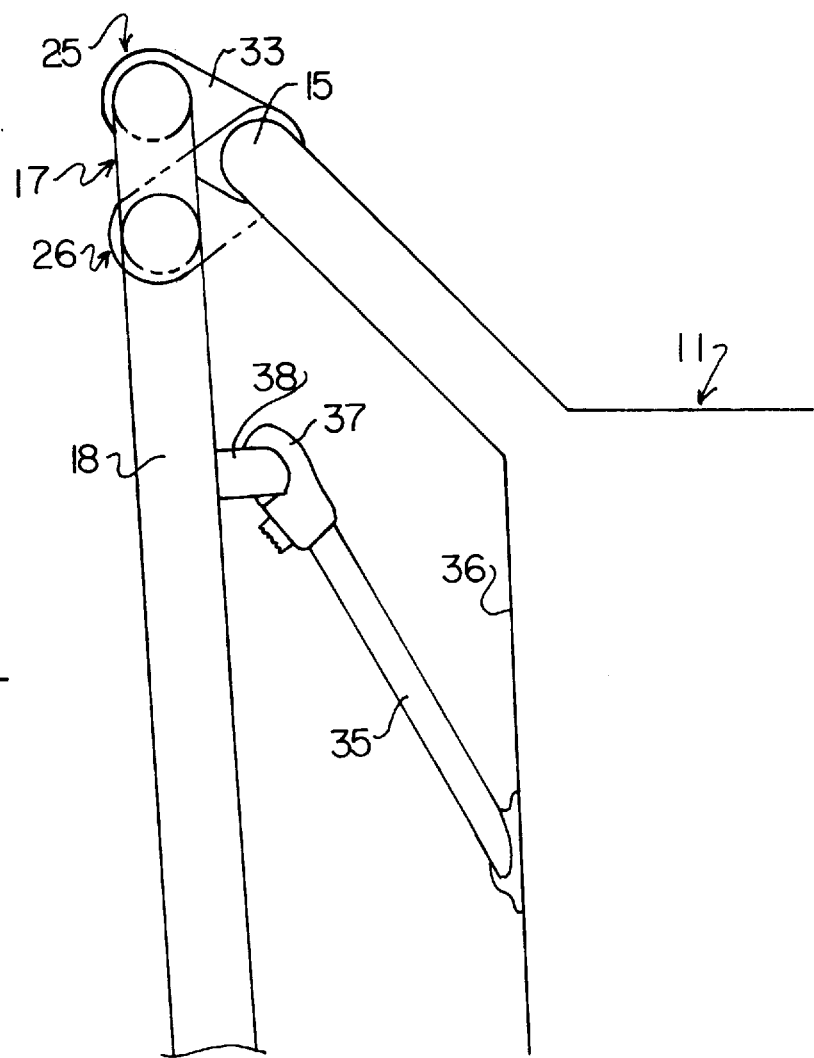
FIG. 4 is a schematic partial side view of the present invention.

With reference to FIG. 4, the upper rod is positionable in raised and lowered positions 25,26. The longitudinal axis of the upper rod lies in a horizontal plane above the longitudinal axis when the upper rod is in the raised position 25. The longitudinal axis of the upper rod lies in a horizontal plane below the longitudinal axis when the upper rod is in the lowered position 26. In use, the upper rod is positioned in the lowered position when the pivot arms are in the engaged position and the upper rod is positioned in the raised position when the brake pads are in the disengaged position.

Preferably, the shopping cart has a pair of wheel housings 27a,27b. The pivot arm of the first side rod and the first rear wheel is provided in a first of the wheel housings and the pivot arm of the second side rod and the second rear wheel is provided in a second of the wheel housings. As illustrated in FIG. 3, each of the wheel housings has an open bottom 28 through which the associated rear wheel is downwardly extended to engage the ground surface.

Each of the pivot arms is biased to position the associated brake pad towards the engaged position. As shown in FIG. 3, preferably, each of the pivot arms has a coiled lower spring 29 biasing the respective pivot arm to pivot the associated brake pad towards the engaged position. Each of the lower springs is provided in the associated wheel housing and extends between a top portion 30 of the associated wheel housing and the respective pivot arm adjacent the brake pad of the respective pivot arm ideally, each of the wheel housings has a generally cylindrical wall 31 downwardly depending from the top portion of the respective wheel housing to surround a portion of the associated lower spring therein. The cylindrical wall of the respective wheel housing helps hold the associated lower spring in its position adjacent to the associated pivot arm.

As illustrated in FIG. 4, the upper rod is biased towards the raised position. Preferably, an upper spring 32 coiled around the handle bar biases the upper rod towards the raised position. Preferably, a sheath 33 substantially covers the upper rod, the handle bar and the upper spring. The sheath helps prevent pinching of the hand and the catching of the fingers of a user between the handle bar and the upper rod when the handle of the user is grasping the handle bar and the upper rod. Ideally the sheath comprises a resilient plastic material for durability and resistance to weathering from outdoor exposure of the shopping cart. Preferably, the upper spring has an extent 34 extending into the sheath to hold the upper spring against rotation around the handle bar so that the upper spring is positioned on the handle bar to effectively bias the upper rod towards the raised position.

As illustrated in FIG. 4, the system 10 also preferably includes a resiliently elastic flexible strap 35 with a first end coupled to a rearwards portion 36 of the basket of the shopping cart. The flexible strap has a second end detachably coupled to one of the side rods. The flexible strap biases the upper rod towards the lowered position so that the brake pad is positioned in the disengaged position. Preferably, the second end of the flexible strap has a spring clip 37 that is hooked on to an eye loop 38 extending from the one side rod to couple the second end of the flexible strap to the one side rod. In use, the flexible strap is designed for holding the upper rod in the lowered position to keep the brake pad in disengaged position so that a row of nested shopping carts (such as when formed during retrieval from a parking lot of a store) may be moved by a single person without holding on to the upper rod of each shopping cart.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A shopping cart safety brake system, comprising:

a shopping cart having a basket, a pair of ground engaging rear wheels, and a rearwardly located handle bar;

a generally rectangular inverted U-shaped connector member having a spaced apart pair of elongate side rods and an upper rod connecting said side rods together;

said upper rod being positioned adjacent said handle bar, said side rods downwardly depending from said upper rod;

each of said side rods terminating at a lower end, said lower end of a first of said side rods being positioned adjacent a first of said rear wheels, said lower end of a second of said side rods being positioned adjacent a second of said rear wheels;

each of said lower ends of said side rods having a pivot arm coupled thereto, each of said pivot arms being pivotally coupled to said shopping cart at a pivot point;

each of said pivot arms having a brake pad;

each of said pivot arms being pivotable to position the associated brake pad between an engaged position and a disengaged position, said brake pad of each of said pivot arms abutting the associated adjacent rear wheel when the respective brake pad is in the engaged position such that each brake pad holds the associated rear wheel against rotation;

said upper rod being positionable in raised and lowered positions, said upper rod being positioned in said raised position when said pivot arms are in said engaged position, said upper rod being positioned in said lowered position when said brake pads are in said disengaged position;

each of said pivot arms being biased to position the associated brake pad towards said engaged position;

wherein said upper rod is biased towards said raised position; and wherein an upper spring coiled around said handle bar biases said upper rod towards said raised position.

2. The shopping cart safety brake system of claim 1, wherein a longitudinal axes of said handle bar and said upper rod are generally parallel to one another.

3. The shopping cart safety brake system of claim 1, wherein said brake pads comprise a resiliently compressible material.

4. The shopping cart safety brake system of claim 1, wherein a longitudinal axis of said upper rod lies in a horizontal plane above a longitudinal axis of said handle bar when said upper rod is in said raised position, and wherein said longitudinal axis of said upper rod lies in a horizontal plane below said longitudinal axis of said handle bar when said upper rod is in said lowered position.

5. The shopping cart safety brake system of claim 1, wherein said shopping cart has a pair of wheel housings, said pivot arm of said first side rod and said first rear wheel being provided in a first of said wheel housings, said pivot arm of said second side rod and said second rear wheel being provided in a second of said wheel housings, each of said wheel housings having an open bottom, each of said rear wheels being downwardly extended from said open bottom of the respective wheel housing.

6. The shopping cart safety brake system of claim 5, wherein each of said pivot arms has a lower spring biasing the respective pivot arm to pivot the associated brake pad towards said engaged position, each of said lower springs being provided in the associated wheel housing, each of said lower springs being extended between a top portion of the associated wheel housing and the respective pivot arm adjacent said brake pad of the respective pivot arm.

7. The shopping cart safety brake system of claim 6, wherein each of said wheel housings has a generally cylindrical wall downwardly depending from said top portion of the respective wheel housing, a portion of the associated lower spring being positioned in said cylindrical wall of the respective wheel housing.

8. The shopping cart safety brake system of claim 1, wherein each of said pivot arms has a lower spring biasing the respective pivot arm to pivot the associated brake pad towards said engaged position.

9. The shopping cart safety brake system of claim 1, further comprising a sheath substantially covering said upper rod and said handle bar.

10. The shopping cart safety brake system of claim 1, further comprising a resiliently elastic flexible strap having a first end coupled to a rearwards portion of a basket of said shopping cart, said flexible strap having a second end detachably coupled to one of said side rods, said flexible strap biasing said upper rod towards said lowered position.

11. A shopping cart safety brake system, comprising:
a shopping cart having a basket, a pair of ground engaging rear wheels and a pair of ground engaging front wheels, and a rearwardly located handle bar positioned above said rear wheels of said shopping cart behind said basket of the shopping cart;

said handle bar having a pair of opposite ends and a longitudinal axis extending between said ends of said handle bar in a generally horizontal plane, said ends of said handle bar being coupled to a pair of rear supports of said shopping carts;

a generally rectangular inverted U-shaped connector member having a spaced apart pair of elongate side rods and an upper rod connecting said side rods together;

each of said rods of said connector member having a longitudinal axis, said longitudinal axes of said side rods being extended generally parallel to one another and generally perpendicular to said longitudinal axis said upper rod;

said upper rod being positioned adjacent said handle bar, said longitudinal axes of said handle bar and said upper rod being generally parallel to one another, said side rods downwardly depending from said upper rod;

each of said side rods terminating at a lower end, said lower end of a first of said side rods being positioned adjacent a first of said rear wheels, said lower end of a second of said side rods being positioned adjacent a second of said rear wheels;

each of said lower ends of said side rods having a pivot arm coupled thereto, each of said pivot arms being pivotally coupled to said shopping cart at a pivot point;

each of said pivot arms having a brake pad, said pivot point of each pivot arm being interposed between said lower end of the respective side rod and the associated brake pad of the respective pivot arm;

each of said pivot arms being pivotable to position the associated brake pad between an engaged position and a disengaged position, said brake pad of each of said pivot arms abutting the associated adjacent rear wheel when the respective brake pad is in the engaged position such that each brake pad holds the associated rear wheel against rotation;

said brake pads comprising a resiliently compressible material;

said upper rod being positionable in raised and lowered positions, said longitudinal axis of said upper rod lying in a horizontal plane above said longitudinal axis of said handle bar when said upper rod is in said raised position, said longitudinal axis of said upper rod lying in a horizontal plane below said longitudinal axis of said handle bar when said upper rod is in said lowered position;

said upper rod being positioned in said raised position when said pivot arms are in said engaged position, said upper rod being positioned in said lowered position when said brake pads are in said disengaged position;

said shopping cart having a pair of wheel housings, said pivot arm of said first side rod and said first rear wheel being provided in a first of said wheel housings, said pivot arm of said second side rod and said second rear wheel being provided in a second of said wheel housings;

each of said wheel housings having an open bottom, each of said rear wheels being downwardly extended from said open bottom of the respective wheel housing;

each of said pivot arms being biased to position the associated brake pad towards said engaged position, wherein each of said pivot arms has a coiled lower spring biasing the respective pivot arm to pivot the associated brake pad towards said engaged position, each of said lower springs being provided in the associated wheel housing, each of said lower springs being extended between a top portion of the associated wheel housing and the respective pivot arm adjacent said brake pad of the respective pivot arm;

each of said wheel housings having a generally cylindrical wall downwardly depending from said top portion of the respective wheel housing, a portion of the associated lower spring being positioned in said cylindrical wall of the respective wheel housing;

said upper rod being biased towards said raised position, wherein an upper spring coiled around said handle bar biases said upper rod towards said raised position;

a sheath substantially covering said upper rod and said handle bar;

said upper spring having an extent extending into said sheath, said extent holding said upper spring against rotation around said handle bar; and a resiliently elastic flexible strap having a first end coupled to a rearwards portion of said basket of said shopping cart, said flexible strap having a second end detach ably coupled to one of said side rods, said flexible strap biasing said upper rod towards said lowered position.

12. A shopping cart safety brake system, comprising:
a shopping cart having a basket, a pair of ground engaging rear wheels, and a rearwardly located handle bar;

a generally rectangular inverted U-shaped connector member having a spaced apart pair of elongate side rods and an upper rod connecting said side rods together;

said upper rod being positioned adjacent said handle bar, said side rods downwardly depending from said upper rod;

each of said side rods terminating at a lower end, said lower end of a first of said side rods being positioned adjacent a first of said rear wheels, said lower end of a second of said side rods being positioned adjacent a second of said rear wheels;

each of said lower ends of said side rods having a pivot arm coupled thereto, each of said pivot arms being pivotally coupled to said shopping cart at a pivot point;

each of said pivot arms having a brake pad;

each of said pivot arms being pivotable to position the associated brake pad between an engaged position and a disengaged position, said brake pad of each of said pivot arms abutting the associated adjacent rear wheel when the respective brake pad is in the engaged position such that each brake pad holds the associated rear wheel against rotation;

said upper rod being positionable in raised and lowered positions, said upper rod being positioned in said raised position when said pivot arms are in said engaged position, said upper rod being positioned in said lowered position when said brake pads are in said disengaged position;

each of said pivot arms being biased to position the associated brake pad towards said engaged position; and a resiliently elastic flexible strap having a first end coupled to a rearwards portion of a basket of said shopping cart, said flexible strap having a second end detachably coupled to one of said side rods, said flexible strap biasing said upper rod towards said lowered position.

13. The shopping cart safety brake system of claim 12, wherein a longitudinal axes of said handle bar and said upper rod are generally parallel to one another.

14. The shopping cart safety brake system of claim 12, wherein said brake pads comprise a resiliently compressible material.

15. The shopping cart safety brake system of claim 12, wherein a longitudinal axis of said upper rod lies in a horizontal plane above a longitudinal axis of said handle bar when said upper rod is in said raised position, and wherein said longitudinal axis of said upper rod lies in a horizontal plane below said longitudinal axis of said handle bar when said upper rod is in said lowered position.

16. The shopping cart safety brake system of claim 12, wherein said shopping cart has a pair of wheel housings, said pivot arm of said first side rod and said first rear wheel being provided in a first of said wheel housings, said pivot arm of said second side rod and said second rear wheel being provided in a second of said wheel housings, each of said wheel housings having an open bottom, each of said rear wheels being downwardly extended from said open bottom of the respective wheel housing.

17. The shopping cart safety brake system of claim 16, wherein each of said pivot arms has a lower spring biasing the respective pivot arm to pivot the associated brake pad towards said engaged position, each of said lower springs being provided in the associated wheel housing, each of said lower springs being extended between a top portion of the associated wheel housing and the respective pivot arm adjacent said brake pad of the respective pivot arm.

18. The shopping cart safety brake system of claim 17, wherein each of said wheel housings has a generally cylindrical wall downwardly depending from said top portion of the respective wheel housing, a portion of the associated lower spring being positioned in said cylindrical wall of the respective wheel housing.

19. The shopping cart safety brake system of claim 12, wherein each of said pivot arms has a lower spring biasing the respective pivot arm to pivot the associated brake pad towards said engaged position.

20. The shopping cart safety brake system of claim 12, further comprising a sheath substantially covering said upper rod and said handle bar.

* * * * *